Figure 1:
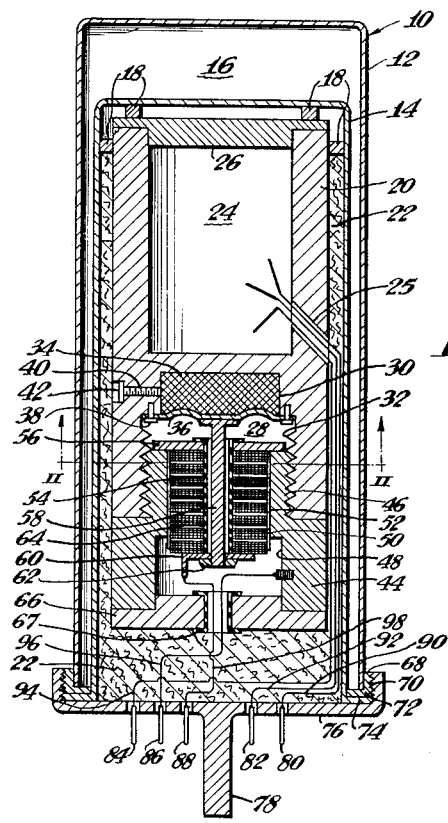

Sept. 18, 1962  R. B. METZ ET AL  3,054,881

HEATING CONTROL DEVICE

Filed May 7, 1957

INVENTORS.
Ramey B. Metz and
Wayne L. Lawrence.
BY

Albert J. Henderson

THEIR ATTORNEY.

3,054,881
HEATING CONTROL DEVICE
Ramey B. Metz, Anaheim, and Wayne L. Lawrence, Rivera, Calif., assignors to Robertshaw-Fulton Controls Company, Richmond, Va., a corporation of Delaware
Filed May 7, 1957, Ser. No. 657,556
7 Claims. (Cl. 219—19)

This invention relates to temperature regulating devices for ovens and particularly to a temperature controlled oven in which piezo-electric crystals are maintained at a constant temperature.

While constant temperature devices have many applications, one specific case concerns an electronic oscillator circuit wherein piezo-electric crystals are utilized as a frequency stabilizing element. The advantage of the inherent frequency stability of such crystals is nullified by a small change in crystal temperature which produces a significant change in the frequency. Crystals used in oscillator circuits must be maintained at a constant temperature in order to retain a constant frequency. Temperature controlled ovens of conventional design are not capable of controlling the temperature of such crystals in precise frequency applications wherein extreme constancy of frequency output is required. Such close control of temperature is usually achieved by relatively large and complex systems which are expensive to construct, are not easily portable, and cannot be feasibly incorporated in a small, compact electronic unit.

Accordingly, it is an object of this invention to construct a constant temperature device for piezo-electric crystals.

Another object of this invention is to construct a constant temperature device which is of a portable size and weight and which is readily adapted for various uses.

A further object of this invention is to utilize the volumetric change of a fusible material to actuate heating control means for maintaining a constant temperature coincident with the heat of fusion temperature of such material.

This invention has another object in that the supply of heat in a temperature control device is regulated in accordance with condition variations of a fusible material which is condition responsive to the heat changes.

This invention has a further object in that the volumetric change of a fusible material is translated into mechanical motion to effect corresponding changes in a variable resistance of an electrical heating unit.

It is an additional object of this invention to arrange a series of carbon discs as the electrical heating element of a temperature controlled oven so that variations in pressure exerted on such carbon discs effect corresponding variations in their electrical resistance and respective variations in the electrical current flowing through such heating element.

It is still another object of this invention to construct the walls of a heating chamber and a crystal chamber in a constant temperature device of a relatively thick, thermally-conductive material so that slight losses or gains in heat will not effect the temperature of the crystal chamber.

This invention is characterized by the use of a relatively thick-walled housing of thermally-conductive material being divided into a crystal chamber and a heating chamber. A mass of fusible crystalline material acting as a thermo-sensitive element is sealed into a portion of the heating chamber by a diaphragm. A crystalline material ordinarily melts at the same temperature at which it solidifies. During the transition of such material from one state to another, a definite amount of heat, known as the heat of fusion, is supplied to or removed from that material without effecting its temperature. However, the volume of the material increases when the material melts and decreases when it solidifies. This volumetric change causes movement of the diaphragm, and a control element connected thereto varies the electrical resistance of a carbon disc heating element to regulate the electrical current flow through the heating element in accordance with the volumetric condition of the fusible material.

Figure 2:
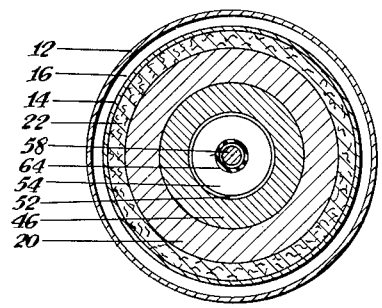

The above objects and other features and advantages of the invention will become apparent from the following description when taken in connection with the accompanying drawing, in which:

FIG. 1 is a longitudinal sectional view of a crystal oven embodying this invention; and FIG. 2 is a cross-section taken on line II—II of FIG. 1.

Referring now to the drawing, the crystal oven, indicated generally at 10, has a cylindrical external jacket 12 and an cylindrical internal jacket 14 spaced therefrom. Jackets 12 and 14 are made of any suitable material of low conductivity, such as stainless steel, and the space 16 therebetween is evacuated to provide additional thermal insulation. A plurality of insulating supports 18 (only four being shown) securely supports cylindrical housing 20 in spaced relation within the internal jacket 14 and insulating material such as fiberglass 22 is positioned therebetween for insulating purposes.

Housing 20 is made of any suitable material of high thermal conductivity, such as copper or aluminum, and has a substantially H-shaped configuration in cross-section. As is apparent in FIG. 1, the walls defining H-shaped housing 20 are relatively thick for a purpose to be described hereinafter. The upper part of H-shaped housing 20 forms a crystal chamber 24 in which a crystal oscillator (not shown) is suitably supported and an aperture 25 in the side wall permits insertion of power conductors into crystal chamber 24. A circular closure plate 26, also made of a high thermally conductive material, fits onto the annular end of housing 20 and closes crystal chamber 24. The lower part of H-shaped housing 20 comprises a heating chamber 28 having a lower threaded cavity 32 and an interior counterbore forming an upper cavity 30. A mass of any suitable fusible material, such as a crystalline material 34, is disposed in cavity 30 and sealed therein by means of a resilient circular diaphragm 36, the periphery of which is rigidly attached to the annular end wall of cavity 32 by any suitable means, such as rivets 38. The crystalline material 34 is introduced in molten form into cavity 30 through a threaded inlet 40 and is sealed therein by a threaded plug 42.

A cylindrical plug member 44, made of any suitable electrically conductive material, has a reduced exteriorly threaded extension 46 which is in threaded engagement with cavity 32. The axial length of extension 46 is smaller than the axial length of cavity 32 so that a portion of cavity 32 is unoccupied. An internal bore 48 through plug member 44 communicates with a relatively smaller internal bore 50 extending through extension 46. The cylindrical bore 50 is provided with an anodized wall surface 52 for the electrical insulation thereof.

A carbon pile heating element consisting of a series of carbon discs 54 are confined within bore 50 by washer 56 attached to the annular end of extension 32. A control plunger 58, having one end rigidly attached to diaphragm 36, extends through the central aperture of washer 56, through the aligned central apertures of carbon pile discs 54, and through the central aperture of washer 60 where its opposite end is secured to button 62 in any suitable manner, such as welding. Carbon pile discs 54 are insulated from extension 46 by the anodized wall surface 52 and an insulating sleeve 64 surrounding plunger 58 insulates plunger 58 from the carbon pile discs 54.

A circular cover plate 66 having a centrally disposed insulating bushing 67 is secured to the annular end of plug member 44 and closes the bore 48.

An annulus 68 has an exteriorly threaded vertical leg 70 whose interior is secured to the lowermost periphery of external jacket 12, and a horizontal leg 72 overlying a flange 74 extending radially outwardly from the bottom of the periphery of internal jacket 14. The whole assembly is sealed by a cup-shaped closure member 76 which is threaded onto the exterior of annulus leg 70. An aligning pin 78 on closure member 76 insures proper alignment of external pins 80, 82, 84, 86, and 88 which fit into sockets in a receptacle (not shown) for external connection. Internal conductors 90, 92, and 94, connected to pins 80, 82, and 84 respectively, lead through the fiberglass 2, through housing aperture 25 into crystal chamber 24. Internal conductors 96 and 98 connected to pins 86 and 88 respectively, lead through bushing 67 into bore 48 where conductor 96 is connected to plug member 44 and conductor 98 is connected to washer 60.

Preparatory to the operation of crystal oven 10, a crystal oscillator (not shown) is inserted in crystal chamber 24 and suitably connected to the power conductors 90, 92, and 94. The crystal chamber 24 is then closed by closure plate 26, and the whole assembly is inserted into internal jacket 14 and sealed therein from dust, moisture, etc., in the atmosphere by threading closure member 76 onto annulus leg 70. When the crystal oven 10 is not in operation, the diaphragm 36 normally exerts a pressure on carbon pile 54 by means of plunger 58 and washer 60; this pressure results from the normal spring constant of diaphragm 36.

During operation, the heating element consisting of carbon pile 54 receives current from an external source (not shown) through a circuit which may be traced as follows: from external pin 86, conductor 96, plug member 44, washer 56, carbon pile 54, washer 60, and conductor 98 to external pin 88. Electrical current flow through carbon pile 54, which acts as a resistance heating element, develops heat that is conducted through plug member 44 and its extension 46 to housing 20 comprising the walls of crystal chamber 24 and cavity 30. Thus, the temperature in crystal chamber 24 is substantially the same as the temperature in cavity 30.

The thermo-sensitive fusible material 34 in cavity 30 is in a solid condition until the crystal chamber temperature and the over-all temperature of housing 20 rises to the fusion point of crystalline material 34 when the latter commences to melt. A continued increase in heat transferred to crystalline material 34 does not affect its temperature, however, the melting continues with a resulting volumetric expansion which is proportional to the amount of material melted. The increase in volume of material 34 moves diaphragm 36 outward and, in turn, pushes plunger 58 to release the pressure on carbon pile 54. This action reduces the electrical contact between the individual carbon discs, thereby increasing the electrical resistance therein. The increased resistance decreases the flow of electric current through carbon pile 54 and the amount of heat developed thereby is correspondingly decreased.

The output temperature of the carbon pile heating element 54 varies in accordance with the condition of crystalline material 34. When the system starts to drop in temperature, material 34 commences to solidify with a resulting decrease in volume, causing diaphragm 36 to move inward by its inherent spring constant whereby plunger 58 exerts a gradually increasing force on carbon pile 54. This increased pressure increases the electrical contact between the discs and, thus, decreases the resistance of carbon pile 54 and increases the input power causing the temperature to rise.

The operating cycle is performed within the heat transfer limits of the fusion temperature of crystalline material 34 so that during operation, a constant temperature device is perfected. Furthermore, the condition variations of crystalline material 34 at its fusion point are utilized as a temperature regulator by effecting corresponding changes in the variable resistance heating element 54 with the result that the heating output of element 54 varies in response with the condition variations of material 34. Since the fusible material 34 is thermally responsive to very minute changes in housing temperature, the overall temperature of the oven system is maintained constant at the fusion temperature of material 34. Therefore, by using different materials having different fusion points, the oven temperature may be stabilized and held constant at the particular fusion point of the material selected. Many organic crystals or eutectic materials may be used and in the disclosed crystal oven, an organic substance, paradibromobenzene, has been used because of its high degree of stability.

The H-shaped housing 20, having a high conductivity, is made relatively thick so that small amounts of heat dissipation or absorption by it will not affect the temperature of crystal chamber 24 because the change in temperature of such a large mass will be negligible for small energy changes. Thus, the temperature of a crystal oscillator will remain substantially constant at all times. Since the housing 20 and its associated parts are thermally insulated from the outside atmosphere by means of fiberglass 22 and the spaced jackets 12 and 14, no appreciable amount of heat can escape from the system, which stabilizes to a temperature determined by thermo-sensitive material 34.

Only one embodiment of the invention has been shown and described herein and inasmuch as this invention is subject to many variations, modifications and reversal of parts, it is intended that all matter contained in the above description of this embodiment shall be interpreted as illustrative and not in a limiting sense.

What is claimed is:

1. A temperature regulating device comprising a plurality of carbon discs superimposed in series relationship to form a heating element having an output temperature variable in accordance with a variable force on said discs, a control member operatively connected to said discs for exerting the force thereon, a mass of fusible material variable in condition and being remotely positioned from said carbon discs but being disposed to respond to the output temperature of the heating element, and connecting means between said mass and said control member for actuation thereof whereby the output temperature of the heating element is varied by the variable force on said discs in response to condition variations of said mass.

2. A temperature controlled crystal oven comprising a housing of thermally conductive material divided into a pair of chambers, diaphragm means sealed in one of the chambers to form a cavity, a mass of fusible material in the cavity and being changeable in condition in response to temperature variations of said housing, a carbon pile heating unit in the said one chamber to heat said housing, control means interconnecting said diaphragm means and said carbon pile heating unit to vary the heat output thereof in accordance with changes in condition of said fusible material.

3. A temperature controlled crystal oven as recited in claim 2 wherein said housing consists of relatively thick walls so that the temperature in the chambers is constant and independent of relatively small amounts of heat variations in said walls.

4. A temperature controlled crystal oven comprising an insulated jacket having a closure member, a housing of highly conductive material being disposed within said jacket and having a crystal chamber and a heating chamber, a series of carbon discs mounted in a portion of the heating chamber and being superimposed in electrical contact with each other to form a carbon pile heating element, means to direct an electric current through said carbon discs for heating said housing and its chambers, a diaphragm mounted within the heating chamber and forming a closed cavity therein, a thermo-sensitive fusible material confined within the cavity and being changeable in state in response to temperature variations of said housing, a control plunger connected to said diaphragm for reciprocation in response to the changes of state of said fusible material, and means connecting said plunger to said carbon discs for varying the electrical resistance thereof in accordance with the plunger reciprocation whereby the electric current through said carbon discs and the quantity of output heat therefrom is dependent upon the state of said fusible material.

5. In a temperature controlled crystal oven, the combination comprising an external insulating jacket, an internal insulating jacket spaced therefrom, a closure member cooperating wth said jackets to seal the interior thereof, a substantially H-shaped housing of conductive material supported within said internal jacket in spaced relation thereto, a crystal chamber formed in one part of said housing, a closure plate cooperating with said housing to close said crystal chamber, a heating chamber formed in another part of said housing, a centrally bored plug member and a cover plate cooperating therewith to close said heating chamber, a carbon pile heating element disposed within the bore of said plug member and being operable to supply a quantity of heat to said housing, a resilient diaphragm fastened within said heating chamber to form a sealed cavity therein, a mass of fusible material filling the cavity and having a fusion point at which it is interchangeable between molten and solid states causing movement of said diaphragm in response to the quantity of heat being conducted through said housing, and a movable control plunger operatively connected to said carbon pile heating element for regulating the supply of heat therefrom, said control plunger being attached to said diaphragm for movement therewith so that the regulating position of said plunger is dependent upon the state of said mass in the cavity.

6. A temperature regulating device comprising a heating element having an output temperature variable in accordance with a variable force thereon, a control member operatively connected to said element for exerting the force thereon, a mass of fusible material variable in condition and being remotely positioned from said element but being disposed to respond to the output temperature of the heating element, and connecting means between said mass and said control member for actuation thereof whereby the output temperature of the heating element is varied by the variable force on the element in response to condition variations of said mass.

7. A temperature regulating device for a space enclosed within temperature equalizing walls, a pressure-responsive heating element disposed to impart heat to said walls, a fusible salt element having a fixed fusion temperature and being substantially expansible upon addition of heat thereto at said temperature, means responsive to expansion of said fusible element applying increasing pressure to said heating element in proportion to said heat addition, and means including said walls for conveying heat from the heater element to the fusible salt element.

References Cited in the file of this patent

UNITED STATES PATENTS

| | | |
|---|---|---|
| 1,663,810 | Morse | Mar. 27, 1928 |
| 2,096,571 | Williams | Oct. 19, 1937 |
| 2,438,345 | Miller | Mar. 23, 1948 |
| 2,488,422 | Mershon | Nov. 15, 1949 |
| 2,524,886 | Colander et al. | Oct. 10, 1950 |
| 2,556,865 | Baldwin | June 12, 1951 |
| 2,897,334 | McFarlane et al. | July 28, 1959 |
| 2,898,434 | Lemmerman et al. | Aug. 4, 1959 |
| 2,898,435 | Crafts | Aug. 4, 1959 |

OTHER REFERENCES

Industrial Heating; vol. XXIII, No. 7, July 1956, pp. 1460, 1462, 1464.